United States Patent
Heuft

(10) Patent No.: US 10,745,211 B2
(45) Date of Patent: Aug. 18, 2020

(54) DIVERTING APPARATUS WITH COANDA STABILIZING DEVICE

(71) Applicant: HEUFT SYSTEMTECHNIK GMBH, Burgbrohl (DE)

(72) Inventor: Bernhard Heuft, Burgbrohl (DE)

(73) Assignee: Heuft Systemtechnik GmbH, Burgbrohl (DE)

(*) Notice: Subject to any disclaimer, the term of this patent is extended or adjusted under 35 U.S.C. 154(b) by 0 days.

(21) Appl. No.: 16/637,963

(22) PCT Filed: Aug. 16, 2018

(86) PCT No.: PCT/EP2018/072233
§ 371 (c)(1),
(2) Date: Feb. 10, 2020

(87) PCT Pub. No.: WO2019/038177
PCT Pub. Date: Feb. 28, 2019

(65) Prior Publication Data
US 2020/0207552 A1    Jul. 2, 2020

(30) Foreign Application Priority Data

Aug. 25, 2017  (DE) .................. 10 2017 008 044

(51) Int. Cl.
*B65G 47/52* (2006.01)
*B65G 21/20* (2006.01)
*B65G 47/76* (2006.01)

(52) U.S. Cl.
CPC ....... *B65G 47/525* (2013.01); *B65G 21/2072* (2013.01); *B65G 47/766* (2013.01); *B65G 2201/0244* (2013.01); *B65G 2207/06* (2013.01)

(58) Field of Classification Search
CPC .... B65G 47/52; B65G 47/525; B65G 47/766; B65G 21/2072

(Continued)

(56) References Cited

U.S. PATENT DOCUMENTS 3,465,870 A * 9/1969 Paulsen ................ B65G 47/766
                                                                 198/367
3,552,537 A * 1/1971 Vamvakas ............ B65G 47/715
                                                                 198/442

(Continued)

FOREIGN PATENT DOCUMENTS

DE            36 23 327 C2   7/1991
DE    10 2009 003 847 A1   11/2010

(Continued)

OTHER PUBLICATIONS

International Preliminary Report on Patentability issued in related application PCT/EP2018/072233, with English language translation, dated Aug. 2, 2019, 10 pages.

*Primary Examiner* — Douglas A Hess
(74) *Attorney, Agent, or Firm* — Faegre Drinker Biddle & Reath LLP

(57) ABSTRACT

The apparatus for diverting objects such as containers, bundles, packages, which are conveyed on a transport apparatus, comprises a first transport device, on which the objects are transported in a single row, a second transport device, which is arranged to the side of the first transport device, and a diverting device, which is provided on one side of the transport apparatus and by means of which an object to be diverted is diverted from the first transport device onto the second transport device. The apparatus furthermore comprises a rail, which is provided on a side of the transport apparatus situated opposite the diverting device, and a device for generating an air jet, wherein the device for generating the air jet is configured such that the air jet which is generated runs parallel to the rail.

9 Claims, 8 Drawing Sheets

(58) Field of Classification Search
 USPC .................. 198/370.02, 370.07, 370.11, 380
 See application file for complete search history.

(56) References Cited

U.S. PATENT DOCUMENTS

| | | | |
|---|---|---|---|
| 3,848,746 A * | 11/1974 | van der Winden | B65G 47/71 |
| | | | 198/442 |
| 4,321,994 A | 3/1982 | Heuft | |
| 4,369,873 A | 1/1983 | Heuft | |
| 4,496,040 A * | 1/1985 | Kronseder | B65G 47/715 |
| | | | 198/434 |
| 5,135,101 A | 8/1992 | Dudley | |
| 5,388,682 A * | 2/1995 | Dudley | B65G 47/766 |
| | | | 198/367 |
| 5,810,516 A | 9/1998 | Ouellette | |
| 6,145,650 A * | 11/2000 | Christ | B65G 47/525 |
| | | | 198/438 |
| 6,401,904 B1 * | 6/2002 | Risley | B07C 5/362 |
| | | | 198/380 |
| 6,588,575 B1 | 7/2003 | Heuft et al. | |
| 6,755,298 B1 * | 6/2004 | Heuft | B07C 5/122 |
| | | | 198/370.07 |
| 6,863,171 B2 * | 3/2005 | Blok | B65G 47/525 |
| | | | 198/370.02 |
| 7,837,022 B2 * | 11/2010 | Schoenke | B65G 21/2018 |
| | | | 198/398 |
| 8,226,331 B2 * | 7/2012 | Derouault | B65G 51/035 |
| | | | 193/31 A |
| 9,309,060 B2 * | 4/2016 | Pucciani | B65G 47/1407 |
| 9,475,656 B2 * | 10/2016 | Sieksmeier | B65G 47/766 |
| 9,682,829 B2 * | 6/2017 | Keil | B65G 47/71 |

FOREIGN PATENT DOCUMENTS

| | | |
|---|---|---|
| EP | 0 019 117 A1 | 11/1980 |
| EP | 1 175 361 B1 | 3/2003 |
| WO | 00/68120 A1 | 11/2000 |

* cited by examiner

DIVERTING APPARATUS WITH COANDA STABILIZING DEVICE

CROSS-REFERENCE TO RELATED APPLICATIONS

This application is the U.S. national phase of the International Patent Application No. PCT/EP2018/072233 filed Aug. 16, 2018, which claims the benefit of German Patent Application No. 10 2017 008 044.5 filed Aug. 25, 2017, the entire content of which is incorporated herein by reference.

FIELD

The present application relates to an apparatus for diverting objects, such as containers, cases, packages, which are conveyed on a transport apparatus.

BACKGROUND

Such diverting apparatuses are used e.g. to separate out defective beverage bottles or other empty or already filled foodstuff containers or packaging. The transport devices are conveyor belts, link chain conveyors or the like, wherein two or more such conveyors run next to each other in parallel at least in sections, and the diverting apparatus is to shift the defective bottles or containers from a first conveyor onto one of the neighbouring conveyors.

It is known from WO 00/68120 (EP 1 175 361 B1) to control the intensity with which the objects are diverted such that the objects receive a diverting impulse of different strength transverse to their transport direction and thereby arrive on one of several second transport apparatuses running next to each other in parallel.

It is likewise known from DE 10 2009 003 847 A1 to control the intensity with which objects are diverted such that the objects receive a diverting impulse of different strength transverse to their transport direction and thereby arrive on a second of several transport apparatuses running next to each other. The transport devices in each case run parallel to each other. The strength of the impulse is defined according to the weight or the centre of gravity of the objects and transmitted to the objects by means of a linear drive.

From DE-C2-36 23 327 an apparatus is known for separating out defective packaging units, wherein the angle at which a pusher pushes the packaging units off the conveyor belt is controlled automatically. The angle is set depending on the transport speed of the conveyor belt and the vector perpendicular thereto of the necessary pushing speed.

It is known from EP 0 019 117 A1 that objects are deflected from a first onto a second transport path running in parallel by means of a plurality of diverting segments. The individual diverting segments form a continuous deflecting surface. After leaving the diverting device, the objects move to the second transport path because of their inertia. For high transport speeds the deflecting surface need not necessarily be continuous. In this case, it is sufficient if only some of the diverting segments form a ramp. The transported objects then move further onto the neighbouring transport paths without guidance because of the inertia.

In particular if the objects to be diverted are relatively light, it can happen in the diverting apparatuses known from the state of the art that the objects tip over during the diversion.

The object of the present disclosure is therefore to improve the diverting process further and to further reduce the danger of the objects to be diverted tipping over.

SUMMARY

This object is achieved in the case of the apparatus of the type named at the beginning by the features of claim 1. The apparatus for diverting objects which are conveyed on a transport apparatus comprises a first transport device, on which the objects are transported in a single row, a second transport device, which is arranged next to the first transport device, and a diverting device, which shifts objects to be diverted from the first transport device onto the second transport device. The diverting device is provided on one side of the transport apparatus. To guide the objects to be diverted, a rail is provided on the side of the transport apparatus situated opposite the diverting device. The diverting device furthermore comprises a device for generating an air jet with at least one flow component which runs parallel to the rail.

In the present disclosure, reference is made to an "air jet" in general. Naturally, the jet can also be generated with another gaseous medium. For example, inert gases or protective gases can be used if the objects to be transported require this. The term "air jet" is thus not to be understood as limited to "air" as gaseous medium.

Objects within the meaning of the present disclosure can be containers such as glass bottles, plastic bottles, containers, cans, cases or other packages. The present disclosure is particularly suitable for diverting lightweight containers such as empty plastic containers or empty cans, which can very easily tip over during transport because of their low weight.

In the present disclosure, a rail for guiding the objects to be diverted is provided along the first and second transport device on the side situated opposite the diverting device. At first this rail extends parallel along the first transport device. In the area of the diverting device the rail is designed curved and follows the transport path of the bottles to be diverted. At the end of the diverting apparatus the rail then runs to the side of the second transport device. The rail serves to guide and stabilize the diverted bottles.

Furthermore a device for generating an air jet, which runs parallel to the rail, is provided according to the disclosure. This air jet represents a preferably locally limited air flow which runs along the plane defined by the rail.

On the one hand the air flow forms an air cushion and serves to absorb hard collisions between the objects to be diverted and the rail. On the other hand the air flow exerts a force pulling in the direction of the rail on the objects to be diverted. This pulling force is produced by the Coanda effect. The Coanda effect occurs when locally limited air flows are guided past surfaces.

Thus, on the one hand, the objects to be diverted are pressed against the rail because of the Coanda effect and, on the other hand, the air stream ensures that the objects do not suffer any hard collisions with the rail. Overall, the objects are therefore guided along the guide rail of the second transport device safely after the diversion process.

As the pulling force on the objects to be diverted produced by the Coanda effect is relatively small, the present disclosure is suitable in particular for stabilizing relatively lightweight objects such as empty bottles or cans.

The Coanda effect occurs in the case of locally limited flows which extend along a surface. For this reason, it is advantageous if the device for generating the air flow has at least one nozzle. With this nozzle, the jet can be guided along the rail of the second transport apparatus in a targeted manner in the desired orientation.

To generate the Coanda effect, it is necessary for the air jet to run parallel to the rail. In an embodiment the air jet can run parallel to the rail and in the transport direction along the rail. As the air jet follows the course of the rail in this configuration, in this embodiment the length of the effective area is relatively great. However, it is to be taken into account that the objects to be diverted can additionally be accelerated because of the air jet coming from behind. In some circumstances this must be taken into account in the dimensioning of the diverting device. This effect can also be utilized advantageously in order to compensate for a deceleration of the bottles to be diverted by the diverting device.

Such an air jet can advantageously be achieved by using a rail with a hollow profile. For example, the rail can have the form of a C profile, wherein a continuous opening or slit is provided on the side of the rail facing the transport area. The outlet of the device for generating the air jet can be arranged inside the hollow profile of the rail. The air jet can then exit through the opening substantially parallel to the rail and in the transport direction following the course of the rail.

This embodiment moreover has the advantage that the air flow can never be completely shielded by the objects to be diverted. Independently of the respective diversion task, in this embodiment a predetermined length of the area of influence of the air jet can be provided.

Through the positioning of the nozzle, it can be determined from what position along the diverting apparatus the air jet is generated and from when the Coanda effect occurs. The stabilizing action of the Coanda effect can thereby also for example already be utilized before the diverting device in the transport direction.

The rail can in principle have any desired suitable cross section. In particular the inner side of the rail, thus the side along which the objects and the air jet are guided, can be designed straight, curved, convex or concave.

The air jet need not necessarily run parallel to the transport direction. The Coanda effect also acts when the air jet is guided parallelly past the rail, but for example at an angle from above or from below. Quite generally, the air jet can be guided past the rail at any desired angle in the rail plane.

The greater the angle of the air jet relative to the transport plane, the shorter the rail area which is covered by the air jet and in which the Coanda effect acts on the objects to be diverted. At the same time, however, the direct acceleration of the bottles, brought about because of the air jet, is also reduced. The angle at which the air jet is guided past the rail in the rail plane can be optimally set individually depending on the diversion task and depending on the field of use.

The flow rate, the air pressure, the jet profile etc. can likewise be set individually depending on the respective diversion task and depending on the field of use. Compressors or compactors customary in the trade can be used to generate the air jet. The specifications of the compressors used can be adapted to the respective diversion task. It has been shown that compactors with a nominal power of between 1 and 4 kW, preferably of approximately 1.5 kW, and a throughflow of between 40 and 100 m$^3$/h, preferably approximately 65 m$^3$/h, at a maximum pressure of between 200 and 600 mbar, are sufficient for the diversion of conventional empty PET containers. In order to limit the quantity of throughflow, for example a frequency converter can additionally be used, with the result that the compactor can be operated not exclusively at the usual mains frequency of 50 Hz, but also at any desired lower frequencies.

The term "transporting devices", as used herein, comprises any type of conveyors typically used in the transport of the above-specified objects. Bottles or cans are preferably transported on chain link conveyors or conveyor belts, which are motor-driven via deflection rollers and can be designed both rectilinear and curved. However, the present disclosure is not limited to the use in chain link conveyors or belts.

The transport devices can in each case be designed rectilinear and arranged either parallel or at a particular angle relative to each other. Rectilinear transport apparatuses are easier to handle and are subject to less wear.

The angle between the first and second transport apparatuses can in principle be chosen as desired. The angle between the first and second transport devices is preferably between 0° and 90°, further preferably between 30° and 60° and particularly preferably approximately 45°. The choice of the angle also depends among other things on the speed at which the objects are conveyed on the first transport device. For very low speeds of the first transport device the angle at which the second transport device is arranged can be very great, e.g. over 80°. For very high speeds, on the other hand, the angle must be chosen to be smaller.

In principle, it is also possible for the angle between the first and second transport devices to be adjustable. For this, for example, the second transport device can be designed movable and can be actuated via a positioning mechanism. If the angle between the transport devices is adjustable, the diverting apparatus can be adapted flexibly to different objects to be transported.

In particular embodiments of the disclosure the first and second transport devices can be arranged one above the other in the area of the diverting device. This makes sense in particular in the case of second transport devices running in a straight line. Through this stacked arrangement, a continuous transport surface can be guaranteed, without the need for stationary transition elements between the transport devices. Such transition elements would lead to undesired friction effects and could negatively influence the diversion.

The transport surface of the first or upper transport device can be designed relatively thin-walled and can be approximately only 0.2 mm, with the result that only a small step must be negotiated by the objects to be diverted during the transition from the first onto the second transport device. This is usually possible without the objects tipping over in the process.

The transport device arranged on top can preferably be designed asymmetrical in the transport direction, with the result that the transport surface of the first transport device is lengthened in the direction of the second transport device, and thus there is a larger overlapping surface between the two transport devices.

The second transport device can also have anon-rectilinear or curved course. The second transport device preferably runs substantially parallel to the first transport device upstream of the diverting apparatus in the conveying direction, then takes a curved course in the area of the diverting apparatus, and then passes over into a rectilinear area again, which then defines the angle between the two transport devices. A non-rectilinearly arranged second transport device can also be arranged underneath the first transport device. In principle, the first transport device can also or only have a non-rectilinear course.

If the second transport device has a curved or convex course, the guide rail is also formed correspondingly convex in the area of the second transport device. However, the effect of the present disclosure can nevertheless be achieved thereby. Namely, the air jet follows the course of the rail because of the Coanda effect. This behaviour of the air jet is advantageous in particular when the air jet is guided parallel to the rail substantially in the transport direction, as the air jet then follows the course of the guide rail even in the case of a curved course of the second transport device. However, even if the air jet is aligned at an angle relative to the transport plane, this effect can be utilized. In such embodiments the jet, for example coming from above, can be guided past a convexly formed inner side of the rail in order then to leave the diverting apparatus on the underside of the rail with an outwardly directed flow component, without resulting in disruptive turbulence which could impair the stability of the objects to be diverted.

The diverting element can in principle be any desired diverting element known to a person skilled in the art. More preferably, the diverting element can be a controllable pusher or slider, which is driven for example via a position-controlled linear motor. Such linear motors are particularly suitable as they are actuated at high speed and high precision and can generate high actuating forces.

If a pusher is used as diverting device, then it is preferably set such that the objects are diverted in a guided manner, thus that the pusher and the object to be diverted are in direct contact with each other over as long a time as possible. The longer an object is guided, the smaller the probability is that the object will tilt during the diversion. At the end of the diversion process, thus when the object to be diverted is located directly on the second transport device, it is then ideally already moving in the direction and at the speed of the second transport device, with the result that no relative movement between the transport device and the object results during this phase. The security against tipping by the diverting apparatus is thereby substantially increased.

A pusher can be arranged perpendicular to or at any desired angle relative to the first transport device. The actuating force of the pusher is preferably so great that objects to be diverted are always acted upon with the same speed component perpendicular to the transport direction of the first transport device independently of their weight and the friction on the transport devices.

The diverting device can also comprise a row of diverting segments, wherein the individual diverting segments are actuatable individually or jointly, and together form a continuous deflecting surface. The advantage of such a diverting apparatus is that the direction of the diversion is fixedly predefined by the deflecting surface, and is thus independent of the transport speed of the first transport device. Moreover, the objects are at all times guided against a rail, with the result that this again contributes to the increase in the stability of the diversion process.

Diverting apparatuses which consist of individual diverting segments are sufficiently known in the state of the art and by way of representation reference is made at this point to the statements in EP-A1-0 019 117 by the same applicant.

Preferably, the diverting device is attached to one side of the transport device. The second transport device, onto which the objects to be diverted are shifted, is then attached to the opposite side of the first transport device. The guide rail, against which the air jet extends, is on the side of the respective transport device situated opposite the diverting device. At first the guide rail extends parallel along the first transport device and then follows the curved course of the transport path of the bottles to be diverted. At the end of the diverting apparatus the rail then runs on the side of the second transport device.

In a further embodiment the first transport device can likewise have a curved course at least after the diverting device. The first transport device preferably has a curved course with an opposite curvature compared with the second transport device. In order to hold the objects on the first transport device, a further diverting device can be provided. In addition, a further device for generating an air jet with at least one flow component, which runs parallel to a rail assigned to the first transport device, can be provided. The construction and mode of operation of this further device for generating an air jet can be identical to that of the device described above. The further device for generating an air jet then serves to stabilize the containers remaining on the first transport device during the transport. If the radius of curvature of the first transport device is large enough, then a second diverting device can even be dispensed with. The Coanda effect alone is namely then sufficient to press the containers against the rail of the first transport device, with the result that the containers can even follow the curved course of this rail without additionally requiring a change in direction by an additional diverting device in the process. The limit radius, thus the radius up to which the containers can still be diverted because of the Coanda effect alone, is dependent on the parameters of the diversion, in particular the transport speed, the container shape, the container weight as well as the strength of the air flow and the flow profile. A person skilled in the art must therefore take these parameters into account in the design of the diverting device. This embodiment can be used advantageously in particular in the case of high container speeds and small diversion angles.

In transport devices which are operated at very high speeds of over 80,000 bottles per hour, it can be sufficient that only some of the diverting segments are used in order to form a ramp which gives the objects to be diverted the required transverse impulse. The objects then move, because of their inertia, in an unguided manner down from the first transport device and then arrive on the second transport device at the desired speed and with the desired movement direction. The short unguided movement section in this case barely impairs the diversion process.

In order to optimize the diversion process, additional data regarding the objects to be diverted can be determined via inspection devices installed upstream of the diverting apparatus. In this way, for example, parameters such as weight, speed, material, friction or contents of an object to be diverted, can be determined. Although this information is in principle not necessary, it can be used to control the diversion process in an even more targeted manner.

The present disclosure also relates to a method for diverting objects, wherein the objects are transported on a first transport device in a single row, wherein the objects to be diverted are diverted by a diverting device from the first transport device onto a second transport device. To guide the objects to be diverted, a rail is provided on the side situated opposite the diverting device. An air jet, which runs parallel to this rail, is generated by means of a device for generating an air jet.

A further advantage of the present disclosure is that apparatuses in which diverted objects are additionally also conveyed further in an altered direction can be built more compact with the aid of the present disclosure. Until now, a two-stage method had to be used for this in conventional transport systems. At first, the objects to be diverted are diverted onto a parallel-running track. These diverted objects can then be brought onto the desired transport direction via a curved conveyor or the like. Because of this sequential method, such conventional systems have a relatively high space requirement. The present disclosure, on the other hand, allows both a diversion and a change in direction of the objects to be diverted to be brought about on a shorter transport path.

BRIEF DESCRIPTION OF THE DRAWINGS

Various embodiments are illustrated in the drawings, in which.

DETAILED DESCRIPTION

Figure 1:
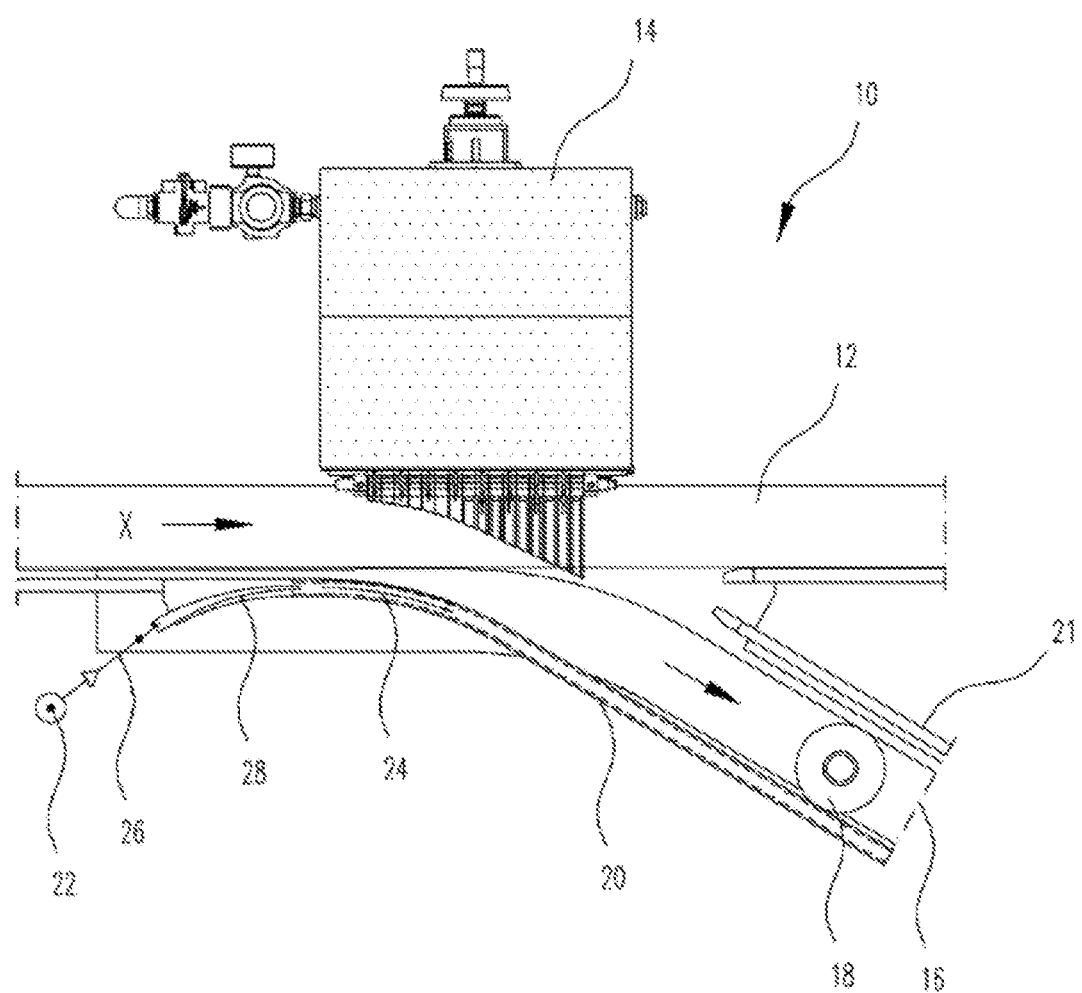
FIG. 1 is a top view of a diverting apparatus with a rectilinear first transport device and a curved second transport device.

FIG. 1 shows a diverting apparatus according to an embodiment. The diverting apparatus forms a diverting deflector 10 for empty plastic bottles. The diverting deflector 10 comprises a first rectilinearly running transport device 12, on which bottles 18 are transported in the direction of the arrow X. The bottles 18 are shifted from the first transport device 12 onto a second transport device 16 by means of a diverting device 14. The second transport device 16 runs parallel to the first transport device 12 in a section located upstream of the diverting device 14, and branches off from the first transport device 12 at an angle α of 30° in a section located downstream of the diverting device 14.

The diverting device 14 is provided on the side of the first transport device 12, namely on the side situated opposite the second transport device 16. In the embodiment depicted in FIG. 1 the diverting device 14 consists of a plurality of individual segments 14a, which together form a continuous deflecting surface.

A rail 20 curved in sections which runs through the diverting apparatus along the transport path of the bottles 18 to be diverted is provided opposite the diverting apparatus. This rail 20 at first extends parallel along the first transport device 12. In the area of the diverting device 14 the rail 20 is designed curved and follows the transport path of the bottles 18 to be diverted. At the end of the diverting apparatus the rail 20 then runs on the side of the second transport device 16. The rail 20 serves to guide and stabilize the diverted bottles 18.

The diverting deflector 10 furthermore comprises a compressed-air generator 22 for generating an air jet 24, which runs along the rail 20. In the embodiment according to FIG. 1, for this purpose, ambient air is blown via a compressed-air hose 26 and a correspondingly arranged nozzle 28 in the transport direction along the inner side of the rail 20.

Because of the Coanda effect, the air jet 24 follows the convex course of the rail 20 at all times. This means that the air jet 24 continues along the surface of the rail 20 even when the rail 20 describes a curve and follows the transport path of the bottles 18 to be diverted through the diverting apparatus. The air jet 24 thus, starting from the nozzle 28, does not run in a straight line, but follows the bent course of the rail 20.

The air jet has a stabilizing effect on the diverted bottles 18. On the one hand, the air jet 24 forms an air cushion between the bottles 18 and the rail 20, and thus absorbs any collisions between the bottles 18 and the rail 20. On the other hand, the air jet 24 has the effect, because of the Coanda effect, that at the same time the bottles 18 experience a pulling force in the direction of the rail 20. This pulling force and the air cushion generated by the air jet 24 ensure that the bottles 18 are guided safely along the rail 20. The bottles 18 are thereby largely prevented from tipping over during the diversion process.

The nozzle 28 is provided on the rail 20 upstream of the diverting device 14. The bottles 18 thereby already come into contact with the air jet 24 before the diverting device. A stabilizing of the bottles 18 during the entire diversion process can thereby be achieved.

In the embodiment represented in FIG. 1, the rail 20 for guiding the air jet 24 is formed as a hollow profile, which has a continuous opening to the transport area.

To generate the air jet 24, in this embodiment, the nozzle 28 of the compressed-air line 26 can open into the inside of the hollow profile of the rail 20. The air jet 24 then runs inside the profile along the rail 20 and also extends through the continuous opening 30 outside the profile parallel to the rail 24. There, the air jet 24 then also flows past the bottles 18 and generates the above-described stabilizing effect on the bottles 18. This embodiment has the advantage that the air jet 24 can never be completely shielded by the bottles 18. If several bottles 18 are diverted directly one behind another, the air jet 24 thus acts on all preceding and already diverted bottles 18.

Figure 2:
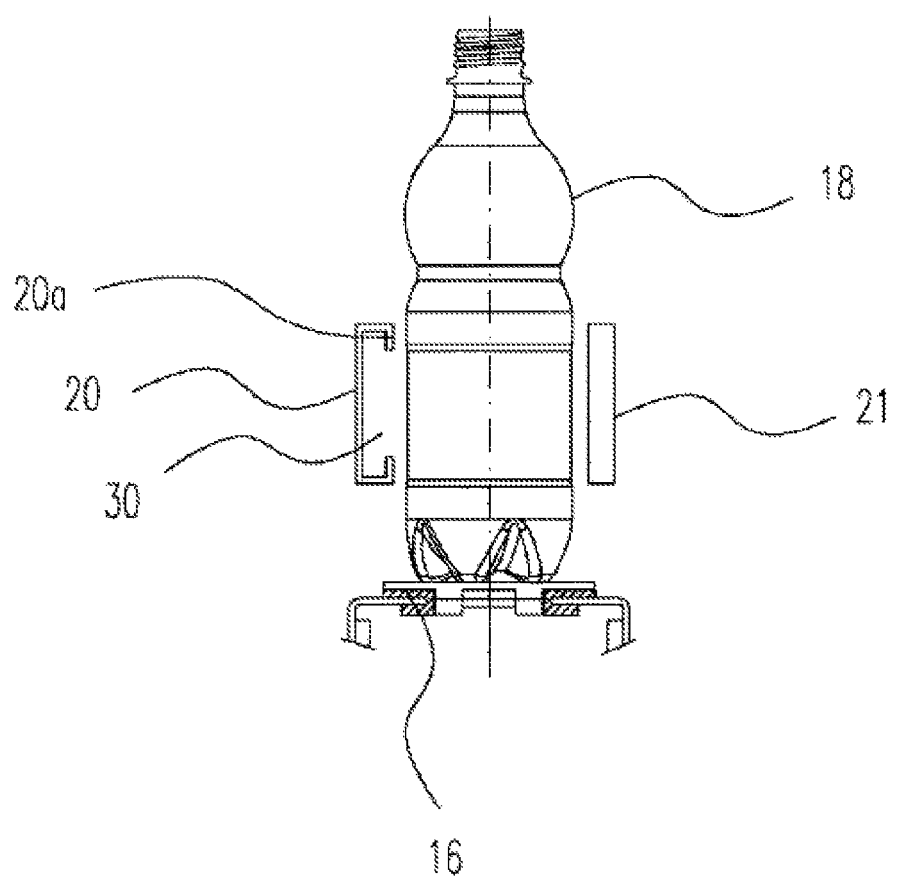
FIG. 2 is a cross section of the second transport device in the diversion area.

A cross section of the diverting area of FIG. 1 is depicted in FIG. 2. The diverted bottle 18 is guided on the second transport device 16 between the rail 20 and an opposite rail 20a. The rail 20 is formed by a hollow profile, more precisely by a C profile. The C profile has a continuous slit or a continuous opening 30 on the side 20a of the rail 20 facing the transport area. The rail depicted in FIG. 2 has a size of approximately 5 cm×1 cm. The continuous slit has a width of approximately 4 cm.

A compactor customary in the trade can be used to generate the air jet. For example, this can be a compactor with a power of 1.5 kW with a quantity of blowing air of 70 m³/h at 400 mbar.

Figure 3:
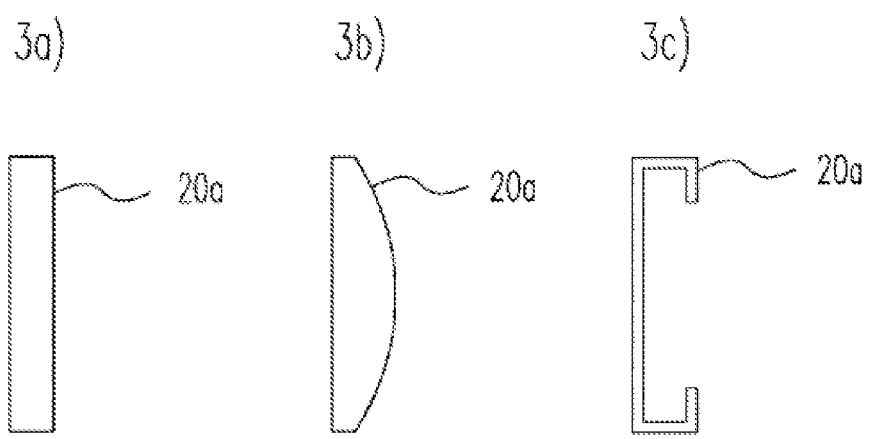
FIG. 3 is a cross sections of different rail profiles.

The rail 20 can also have other profiles. Alternative rail profiles are depicted in FIG. 3. Besides the already described hollow profile, such as is depicted in FIG. 3c, a rail with a rectangular profile according to FIG. 3a or a rounded profile according to FIG. 3b can also be used.

In the embodiments represented in FIGS. 1 and 2 the air jet 24 runs substantially in the transport direction and parallel along the inner side of the rail 20. The stabilizing effect can, however, also be achieved with an air jet 24 which runs substantially parallel to the rail plane, but at a predefined angle β with respect to the transport plane.

Figure 4:
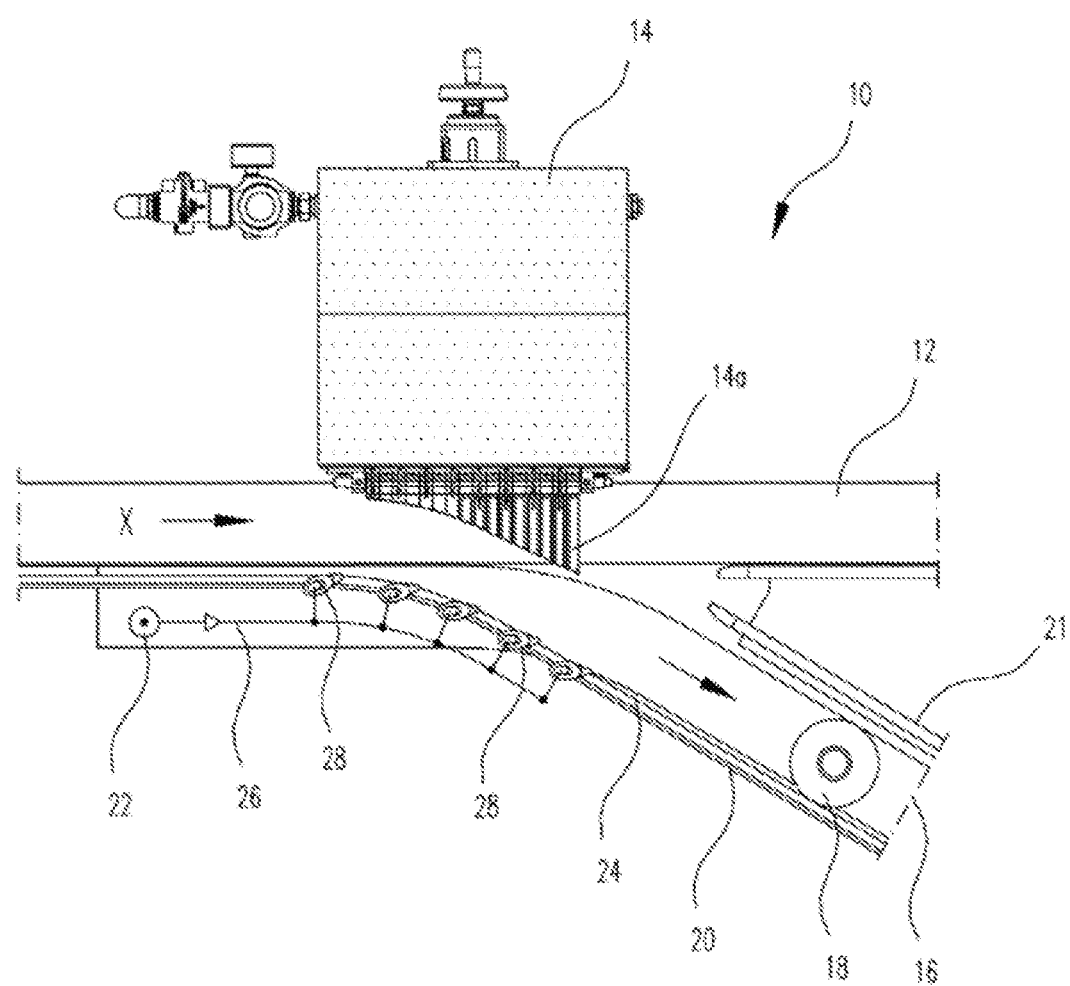
FIG. 4 is a top view of a further diverting apparatus, wherein the air jet extends at an angle relative to the transport plane.
Figure 5:
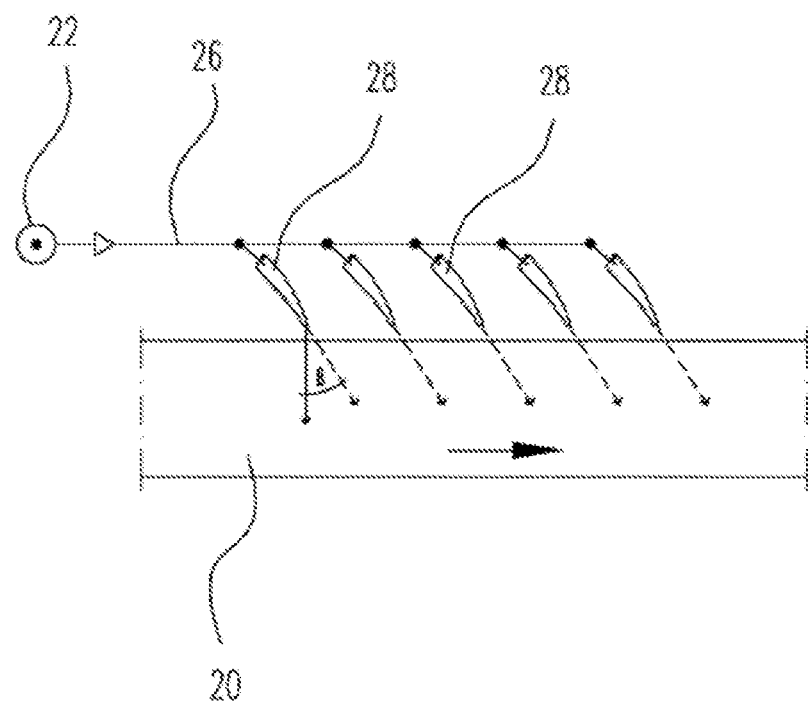
FIG. 5 is a side view of the diverting apparatus with rail and diagonally running air jet according to FIG. 4.
Figure 6:
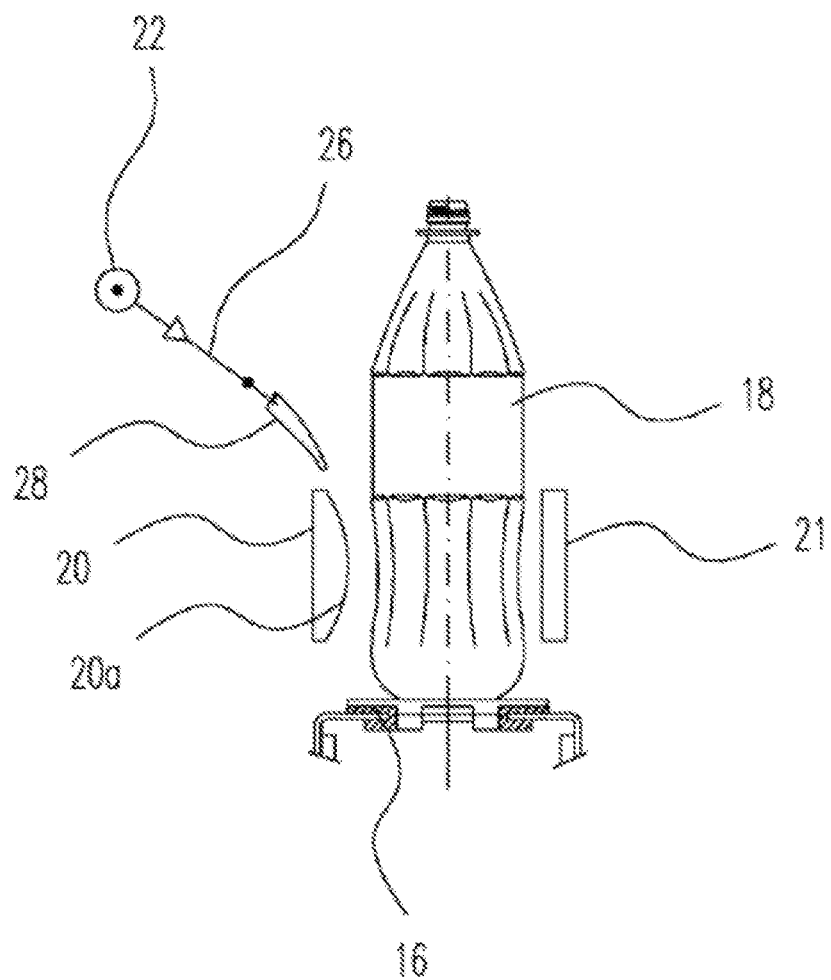
FIG. 6 is a cross section of the second transport device according to FIG. 4 in the diversion area.

Such an embodiment is represented in FIGS. 4 to 6. A diverting deflector 10 is likewise depicted in FIG. 4, in which the second transport device 16 describes a curve, and branches off at an angle of 30° relative to the first transport device 12. The diverting device again consists of a plurality of individual segments 14a, which together form a continuous deflecting surface.

The stabilizing air jet 24 is generated by means of several nozzles 28. As represented in FIG. 5, the nozzles 28 are arranged above the rail 20 at an angle of approximately 40° in relation to the transport plane. In this embodiment the air jets 24 are likewise guided between the bottles 18 and the rail 20 on the inner side of the rail 20. Although the air jet 24 interacts with the bottles 18 only in a relatively short area, this area can be lengthened as required through the arrangement of several nozzles 28 spaced apart from each other.

The rail profile in this case, as represented in FIG. 6, is rounded on the inner side 20a, wherein the air jets 24 again follow the curvature of the inner side 20a of the rail 20 because of the Coanda effect.

As the component of the air jet 24 running in the transport direction is smaller in this embodiment, the acceleration of the bottles caused by the air jet 24 is likewise greatly reduced.

In the realization of the diverting apparatus according to the disclosure, the angles α, β and the speed of the air jet 24 can be adapted to the respective transport task and can be set depending on the transport devices 12, 16 used and the properties of the bottles 18 to be diverted.

Figure 7:
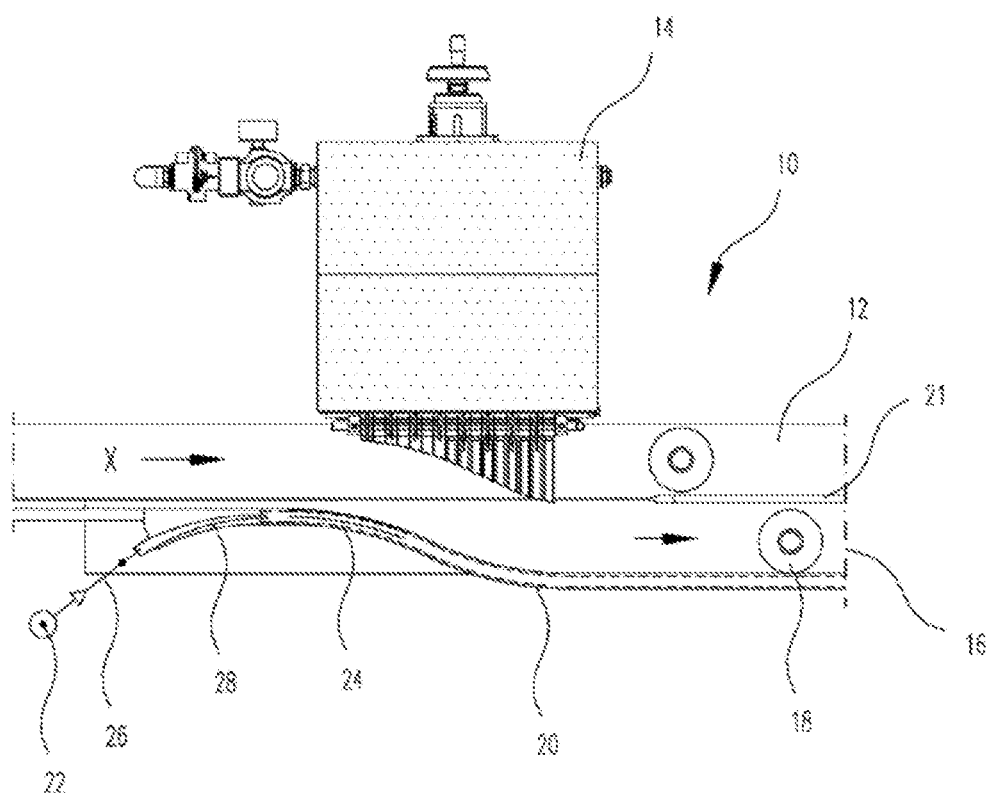
FIG. 7 is a top view of a diverting apparatus with a rectilinear first transport device and a second transport device running parallel thereto.

A further embodiment of the diverting apparatus 10 according to the disclosure is depicted in FIG. 7. This apparatus substantially corresponds to the apparatus such as is depicted in FIG. 1. However, in FIG. 7 the bottles 18 to be diverted are pushed onto a second transport device 16 which runs parallel to the first transport device 12. In this case too, the stabilizing action of the air jet 24 can be advantageously utilized, as the air jet 24 also follows the curvature of the lateral rail 20 in this case.

Figure 8:
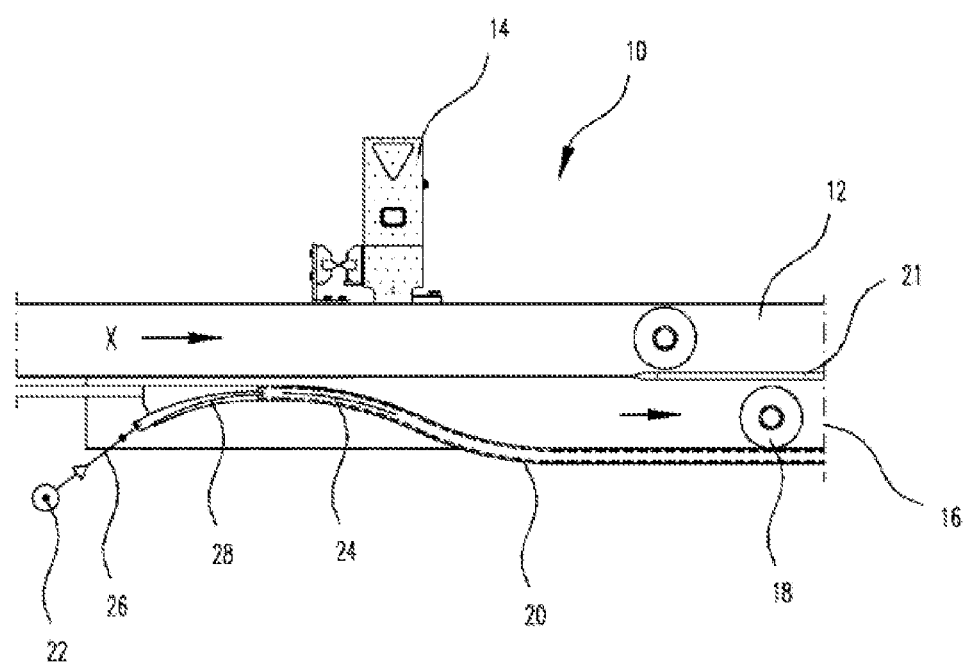
FIG. 8 is a diverting apparatus according to FIG. 7 with a pusher as diverting device.

The embodiment represented in FIG. 8 substantially corresponds to the apparatus such as is depicted in FIG. 7. Again, the bottles 18 to be diverted are pushed onto a second transport device 16 which runs parallel to the first transport device 12. In FIG. 7, however, the diverting device 14 is formed by a pusher, which comprises a position-controlled linear drive. Bottles 18 to be diverted are shifted from the first transport device 12 onto the second transport device 16 with the pusher.

LIST OF REFERENCE NUMBERS 10 diverting deflector
12 first transport device
14 diverting device
14a diverting segments
16 second transport device
18 bottles
20 rail
20a rail inner side
21 rail
22 compressed-air generator
24 air jet
26 compressed-air hose
28 nozzle
30 rail opening

The invention claimed is:

1. An apparatus for diverting objects, such as containers, cases, packages, which are conveyed on a transport apparatus,
    with a first transport device, on which the objects are transported in a single row,
    with a second transport device, which is arranged on the side of the first transport device,
    with a diverting device, which is provided on one side of the transport apparatus and with which an object to be diverted is diverted from the first transport device onto the second transport device, and
    with a rail, which is provided on a side of the transport apparatus situated opposite the diverting device,
    characterized by
    a device for generating an air jet, wherein the device for generating the air jet is configured such that the generated air jet runs parallel to the rail, and
    wherein the device for generating an air jet comprises at least one nozzle, which is provided at the rail upstream from the diverting device.

2. The apparatus according to claim 1, wherein the air flow onto the objects to be diverted produces a force in the direction of the rail.

3. The apparatus according to claim 1, wherein the air jet is generated by a compressed-air generator and is aligned parallel to the rail via a compressed-air line with a nozzle.

4. The apparatus according to claim 1, wherein the air jet runs parallel to the rail and in a transport direction of the objects.

5. The apparatus according to claim 1, wherein the rail has a hollow profile, through which the air jet is conducted, and wherein the rail has at least one opening, through which the air jet exits substantially parallel to the rail.

6. The apparatus according to claim 1, wherein the air jet runs parallel to the rail and at a predefined angle relative to a transport plane defined by the transport devices.

7. The apparatus according to claim 1, wherein the second transport device runs substantially parallel to the first transport device upstream in the conveyor direction and deviates from the first transport device at an optionally adjustable angle in the area of the diverting device.

8. The apparatus according to claim 1, wherein the diverting device comprises a row of diverting segments, and wherein the individual diverting segments together form a continuous deflecting surface.

9. A method for diverting objects, such as containers, cases, packages, which are conveyed on a transport apparatus,
    with a first transport device, on which the objects are transported in a single row,
    a second transport device, which is arranged on a side of the first transport device,
    with a diverting device, which is provided on one side of the transport apparatus and with which an object to be diverted is diverted from the first transport device onto the second transport device,
    with a rail, which is provided on the side of the transport apparatus situated opposite the diverting device,
    characterized in that
    a device for generating an air jet is provided, wherein the device for generating the air jet is configured such that the generated air jet runs parallel to the rail, and
    wherein the device for generating an air jet comprises at least one nozzle, which is provided at the rail upstream from the diverting device.

* * * * *